US008507050B2

(12) United States Patent
Faler et al.

(10) Patent No.: US 8,507,050 B2
(45) Date of Patent: Aug. 13, 2013

(54) METHODS FOR DEPOSITING ULTRA THIN COATINGS EXHIBITING LOW HAZE AND METHODS FOR THE PREPARATION OF SUCH COATINGS

(75) Inventors: Dennis L. Faler, North Huntingdon, PA (US); Shawn A. DeSaw, McMurray, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 583 days.

(21) Appl. No.: 12/269,290

(22) Filed: Nov. 12, 2008

(65) Prior Publication Data

US 2010/0119735 A1 May 13, 2010

(51) Int. Cl.
C08J 7/18 (2006.01)

(52) U.S. Cl.
USPC .................. 427/514; 427/384; 427/385.5

(58) Field of Classification Search
USPC ........................ 427/514, 384, 385.5
See application file for complete search history.

(56) References Cited

U.S. PATENT DOCUMENTS

| 3,389,061 | A | 6/1968 | Bono ............................. 204/32 |
| 4,499,143 | A | 2/1985 | Panush ......................... 428/336 |
| 4,753,827 | A | 6/1988 | Yoldas et al. ................. 427/387 |
| 4,754,012 | A | 6/1988 | Yoldas et al. ................. 528/10 |
| 5,035,745 | A | 7/1991 | Lin et al. ................. 106/287.16 |
| 5,106,533 | A | 4/1992 | Hendrickson et al. ........ 252/314 |
| 5,110,881 | A | 5/1992 | McBain et al. ............... 525/455 |
| 5,199,979 | A | 4/1993 | Lin et al. ................. 106/287.14 |
| 5,201,948 | A | 4/1993 | Fasano et al. ................ 106/311 |
| 5,334,297 | A | 8/1994 | Nakada et al. ............. 204/181.2 |
| 5,340,789 | A | 8/1994 | Evans et al. ................... 503/227 |
| 5,348,998 | A | 9/1994 | Ito et al. ........................ 524/190 |
| 5,382,431 | A | 1/1995 | Pickart ......................... 424/401 |
| 5,480,633 | A | 1/1996 | Simion et al. ................. 424/70.1 |
| 5,538,548 | A | 7/1996 | Yamazaki ................... 106/20 C |
| 5,538,549 | A | 7/1996 | Kato et al. ................... 106/20 C |
| 5,716,435 | A | 2/1998 | Aida et al. ................... 106/31.85 |
| 5,747,015 | A | 5/1998 | Oshika et al. ............... 424/70.14 |
| 5,792,559 | A | 8/1998 | Heithoff et al. ............... 428/437 |
| 5,797,976 | A | 8/1998 | Yamashita ........................ 71/26 |
| 5,837,041 | A | 11/1998 | Bean et al. ................... 106/31.6 |
| 5,902,711 | A | 5/1999 | Smith et al. ................... 430/137 |
| 5,942,027 | A | 8/1999 | Ikai et al. ................... 106/31.33 |
| 5,990,219 | A | 11/1999 | Sakai et al. ................... 524/441 |
| 6,030,440 | A | 2/2000 | Sekioka et al. ............. 106/31.65 |
| 6,031,024 | A | 2/2000 | Uraki et al. ................... 523/161 |
| 6,099,627 | A | 8/2000 | Saibara et al. .............. 106/31.33 |
| 6,106,605 | A | 8/2000 | Basil et al. ................. 106/287.12 |
| 6,153,001 | A | 11/2000 | Suzuki et al. .............. 106/31.65 |
| 6,175,053 | B1 | 1/2001 | Tsubouchi ....................... 602/43 |
| 6,187,438 | B1 | 2/2001 | Chopin et al. ................. 428/403 |
| 6,296,860 | B1 | 10/2001 | Hasegawa et al. ............ 424/401 |
| 6,329,058 | B1 | 12/2001 | Arney et al. ................... 428/403 |
| 6,329,319 | B1 | 12/2001 | Puglisi et al. ................... 504/100 |
| 6,337,131 | B1 | 1/2002 | Rupaner et al. ............... 428/403 |
| 6,342,484 | B1 | 1/2002 | Kulkarni et al. ................. 514/44 |
| 6,355,189 | B1 | 3/2002 | Basil et al. ..................... 252/588 |
| 6,387,997 | B1 | 5/2002 | Grolemund et al. .......... 524/506 |
| 6,410,619 | B2 | 6/2002 | Greene et al. ..................... 524/88 |
| 6,414,080 | B1 | 7/2002 | Loeffler et al. ................. 524/801 |
| 6,416,818 | B1 | 7/2002 | Aikens et al. ............... 427/383.1 |
| 6,417,249 | B1 | 7/2002 | Nguyen et al. ................. 523/201 |
| 6,428,797 | B2 | 8/2002 | Fishman ........................ 424/401 |
| 6,569,439 | B1 | 5/2003 | Stier ............................. 424/401 |
| 6,572,690 | B2 | 6/2003 | Rehman et al. ............. 106/31.58 |
| 6,585,817 | B2 | 7/2003 | Lee et al. ................... 106/31.58 |
| 6,592,657 | B2 | 7/2003 | Lee et al. ................... 106/31.58 |
| 6,624,276 | B2 | 9/2003 | Lamers et al. ................... 528/45 |
| 6,666,983 | B2 | 12/2003 | Marietti et al. .................. 216/75 |
| 6,726,900 | B2 | 4/2004 | Scancarella et al. ............ 424/64 |
| 6,818,207 | B1 | 11/2004 | Schoon et al. ................... 424/61 |
| 6,841,591 | B2 | 1/2005 | Vincent et al. ................ 523/160 |
| 6,852,153 | B2 | 2/2005 | Uhlir-Tsang et al. ....... 106/31.27 |
| 6,858,301 | B2 | 2/2005 | Ganapathiappan ........... 428/407 |
| 6,875,800 | B2 | 4/2005 | Vanier et al. ................. 523/210 |
| 6,894,086 | B2 | 5/2005 | Munro et al. ................. 523/105 |
| 6,900,176 | B2 | 5/2005 | Dyker et al. ...................... 514/11 |
| 6,939,536 | B2 | 9/2005 | Chen et al. ................... 424/70.1 |
| 2002/0061407 | A1 | 5/2002 | Colton et al. ................. 428/447 |
| 2002/0077385 | A1 | 6/2002 | Miyabayashi ................ 523/160 |
| 2002/0086168 | A1 | 7/2002 | Sadvary et al. ............... 428/447 |
| 2002/0149002 | A1 | 10/2002 | Womelsdorf et al. ....... 252/363.5 |
| 2002/0193514 | A1 | 12/2002 | Wang et al. ................... 524/853 |
| 2003/0125416 | A1 | 7/2003 | Munro et al. ................. 523/171 |
| 2003/0125417 | A1 | 7/2003 | Vanier et al. ................. 523/171 |
| 2003/0177943 | A1 | 9/2003 | Auweter et al. ............ 106/31.28 |
| 2004/0156994 | A1 | 8/2004 | Wiese et al. ................ 427/372.2 |
| 2005/0142094 | A1 | 6/2005 | Kumar ........................ 424/70.14 |
| 2005/0159523 | A1 | 7/2005 | Bremser et al. ............... 524/431 |
| 2005/0182169 | A1 | 8/2005 | Stubbe et al. ................. 524/379 |
| 2005/0212159 | A1 | 9/2005 | Richards et al. ............. 264/40.7 |
| 2005/0212171 | A1 | 9/2005 | Ferencz et al. ............. 264/211.21 |
| 2005/0213423 | A1 | 9/2005 | Ferencz et al. ............... 366/76.2 |
| 2005/0255060 | A1 | 11/2005 | Oblong et al. ................... 424/59 |
| 2005/0287348 | A1 | 12/2005 | Faler et al. ................. 428/315.5 |
| 2006/0014099 | A1 | 1/2006 | Faler et al. ................. 430/270.1 |
| 2006/0144290 | A1 | 7/2006 | Polk et al. ................... 106/31.65 |
| 2006/0191442 | A1 | 8/2006 | He et al. ....................... 106/499 |
| 2006/0246305 | A1 | 11/2006 | Cheng et al. ................. 428/447 |
| 2006/0247372 | A1 | 11/2006 | Faler et al. ................... 524/847 |
| 2006/0251896 | A1 | 11/2006 | Ferencz et al. ............... 428/407 |
| 2006/0252881 | A1 | 11/2006 | DeSaw et al. ................ 524/847 |

(Continued)

FOREIGN PATENT DOCUMENTS

| DE | 103 11 849 A1 | 9/2004 |
| EP | 0 773 268 A2 | 5/1997 |

(Continued)

Primary Examiner — Robert S Walters, Jr.

(74) Attorney, Agent, or Firm — Justin F Martinchek; Julie W. Meder

(57) ABSTRACT

Disclosed are methods for depositing an ultra thin coating that exhibits both low haze (high transparency) and strong color (high optical density at a given film thickness). Also disclosed are methods for making radiation curable coating compositions comprising polymer-enclosed particles that are suitable for producing ultra thin coatings.

17 Claims, No Drawings

(56) References Cited

U.S. PATENT DOCUMENTS

| | | |
|---|---|---|
| 2007/0149654 A1 | 6/2007 | Cheng et al. ............... 523/336 |
| 2008/0112909 A1 | 5/2008 | Faler et al. ............... 424/61 |
| 2009/0042020 A1 | 2/2009 | Ferencz et al. ............... 428/327 |

FOREIGN PATENT DOCUMENTS

| | | |
|---|---|---|
| EP | 1006161 A1 | 6/2000 |
| EP | 1 125 760 A1 | 8/2001 |
| EP | 1 132 448 A2 | 9/2001 |
| EP | 1 201 684 A2 | 5/2002 |
| EP | 1 245 589 A1 | 10/2002 |
| EP | 1371694 A2 | 12/2003 |
| EP | 1 422 072 A1 | 5/2004 |
| EP | 1 426 422 A1 | 6/2004 |
| WO | WO 99/63006 | 12/1999 |
| WO | WO 02/14391 A2 | 2/2002 |
| WO | WO 02/26894 A1 | 4/2002 |
| WO | WO 02/062881 A2 | 8/2002 |
| WO | WO 2004/000916 A2 | 12/2003 |
| WO | WO 2004/081222 A2 | 9/2004 |
| WO | WO 2005/000914 A1 | 1/2005 |
| WO | WO 2006/077256 A1 | 7/2006 |
| WO | WO 2007/024461 A2 | 3/2007 |
| WO | WO 2007/024462 A2 | 3/2007 |

METHODS FOR DEPOSITING ULTRA THIN COATINGS EXHIBITING LOW HAZE AND METHODS FOR THE PREPARATION OF SUCH COATINGS

FIELD OF THE INVENTION

The present invention relates to, among other things, methods for depositing an ultra thin coating that exhibits both low haze (high transparency) and strong color (high optical density at a given film thickness). The present invention also relates to methods for making radiation curable coating compositions comprising polymer-enclosed particles that are suitable for producing ultra thin coatings deposited according to the foregoing methods.

BACKGROUND INFORMATION

It is often desirable, for aesthetic and other reasons, to provide articles, such as architectural windows, automotive windows, eyewear lenses, and consumer electronics display pieces, among other items, that exhibit a desired color while still being transparent. Such color is sometimes obtained by the use of dyes that are included in the composition used to manufacture the glass or transparent plastic material. Alternatively, a colored film or coating containing a dye may be deposited upon the material. Pigments have been avoided because they typically produce hazy or opaque materials with reduced transparency.

Dyes, while often suitable for use in preparing colored transparent articles, also suffer from some drawbacks. Dyes are subject to degradation by visible light and/or ultraviolet light. In addition, dyes tend to migrate to the coating surface over time, thereby limiting the amount of dye that can effectively be included in the coating. As a result, materials colored with dyes are typically less durable and exhibit less colorfastness than comparable materials colored with pigments. Also, it is difficult to achieve strong colors using dyes, particularly at low film thicknesses.

The haziness of coatings produced from pigments often results from the use of pigment particles that have a size, often 0.5 micrometers ("microns") or larger, that absorb light at certain wavelengths and scatter light at other wavelengths. This partial absorption and partial scattering creates a degraded coloration effect when viewed by an observer. Coatings that employ large amounts of such pigments, therefore, are not typically suitable for the production of a colored coating having low haze.

It is sometimes desirable, for cost and optical quality, among other reasons, to employ ultra thin coatings, i.e., coatings having a thickness of less than 2 microns. It would also sometimes be desirable for such coatings to exhibit both a strong color, i.e., a relatively high optical density at a given film thickness, while maintaining low haze, i.e., a relatively high level of transparency. Attainment of coatings with strong color, however, typically requires the use of a relatively large amount of colorant, such as pigment, which, as indicated above, is problematic when using pigment particles that exhibit degraded coloration effects.

The present invention relates to the surprising discovery that coating compositions containing certain organic pigments can be used in relatively large quantities, i.e., 20 percent by weight or more, based on the total weight of the composition, to produce ultra thin coatings that exhibit low haze and a strong color.

SUMMARY OF THE INVENTION

In certain respects, the present invention is directed to methods for coating a non-cellulose based substrate. These methods comprise: (a) depositing a composition on the substrate, the composition comprising: (i) at least 20 percent by weight, based on the total solids weight of the composition, of organic pigment nanoparticles; and (ii) a binder in which the nanoparticles are dispersed; and (b) curing the binder to form a cured coating that has low haze and a dry film thickness of no more than 2 microns.

In yet other respects, the present invention is directed to methods for making an aqueous dispersion of polymer-enclosed particles. The methods comprise: (1) providing a mixture, in an aqueous medium, of (a) particles, and (b) a polymerizable ethylenically unsaturated compound comprising a multi-functional ethylenically unsaturated monomer; and (2) polymerizing a portion of the multi-functional ethylenically unsaturated monomer to form a radiation curable aqueous dispersion of polymer-enclosed particles.

In still other respects, the present invention is directed to radiation-curable coating compositions. These coating compositions comprise: (a) at least 20 percent by weight, based on the total weight of the composition, of polymer-enclosed organic pigment nanoparticles; (b) a radiation curable binder comprising a multifunctional ethylenically unsaturated compound; and (c) water.

The present invention is also directed to, among other things, related coated substrates.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to methods for coating a non-cellulose based substrate. As used herein, the term "substrate" refers to a solid surface on which a coating is deposited. As used herein, the term "non-cellulose based substrate" refers to substrates that are not based on cellulose, which is a complex carbohydrate, $(C_6H_{10}O_5)_n$, that is composed of glucose units. Specific examples of cellulose-based materials are wood and paper. As a result, in certain embodiments, the methods of the present invention are directed to coating a substrate that is not wood and/or paper.

In certain embodiments, the methods of the present invention comprise coating a "non-porous" substrate. As used herein, the term "non-porous substrate" refers to substrates that are not porous, i.e., they do not contain pores or interstices via which a liquid composition may penetrate the substrate surface, such as is the case with, for example wood and paper.

The methods of the present invention may comprise coating a substrate formed from any of a variety of materials, such as metals, silicates, polymers, textiles, leathers, and compressible materials.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the present invention. Such weldable coating compositions are disclosed in U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

In certain embodiments, the substrate comprises a polyamide, such as a reinforced polyamide substrate.

As used herein, the term "polyamide substrate" refers to a substrate constructed from a polymer that includes repeating units of the formula:

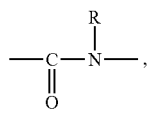

wherein R is hydrogen or an alkyl group. The polyamide may be any of a large class of polyamides based on aliphatic, cycloaliphatic, or aromatic groups in the chain. They may be formally represented by the products of condensation of a dibasic amine with a diacid and/or diacid chloride, by the product of self-condensation of an amino acid, such as omega-aminoundecanoic acid, or by the product of a ring-opening reaction of a cyclic lactam, such as caprolactam, lauryllactam, or pyrrolidone. They may contain one or more alkylene, arylene, or aralkylene repeating units. The polyamide may be crystalline or amorphous. In certain embodiments, the polyamide substrate comprises a crystalline polyamide of alkylene repeating units having from 4 to 12 carbon atoms, such as poly(caprolactam), known as nylon 6, poly(lauryllactam), known as nylon 12, poly(omega-aminoundecanoic acid), known as nylon 11, poly(hexamethylene adipamide), known as nylon 6.6, poly(hexamethylene sebacamide), known as nylon 6.10, and/or an alkylene/arylene copolyamide, such as that made from meta-xylylene diamine and adipic acid (nylon MXD6). Amorphous polyamides, such as those derived from isophoronediamine or trimethylcyclohexanediamine, may also be utilized.

As used herein, the term "reinforced polyamide substrate" refers to a polyamide substrate constructed from a polyamide that has been reinforced through the inclusion of, for example, fibrous materials, such as glass fiber or carbon fiber, or inorganic fillers, such as calcium carbonate, to produce a polyamide having increased rigidity, strength, and/or heat resistance relative to a similar polyamide that does not include such reinforcing materials. Reinforced polyamides, which are suitable for use as a substrate material in accordance with certain embodiments of the present invention, are commercially available and include, for example, those materials commercially available from Solvay Advanced Polymers under the IXEF® name and, include, for example, the IXEF 1000, 1500, 1600, 2000, 2500, 3000 and 5000 series products; from EMS-Chemie Inc., Sumter, S.C., under the Grilamid®, Grivory®, Grilon® and Grilflex® tradenames; and DuPont Engineered Polymers, such as those sold under the Thermx® and Minlon® tradenames.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co)polymers of (meth) acrylic acid compounds or melamine/, dicyanodiamide/and/ or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises an open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

In certain embodiments of the present invention, the substrate itself is transparent. As used herein, "transparent", when referring to a substrate means that a surface beyond the substrate is visible to the naked eye when viewed through the substrate. Depending upon the desired application, such a transparent article or substrate can have relatively low transmission, i.e., a spectral transmission of no more than 50% or, in some cases, no more than 10%, or, in yet other cases, no more than 5%, while, in other cases, the transparent article can have a relatively high transmission, i.e., a spectral transmission of more than 50%, in some cases at least 60%, or, in yet other cases, at least 80%. The foregoing spectral transmission values being measured at a wavelength ranging from 410 nanometers to 700 nanometers, based upon ASTM Standard No. D-1003 using a Hunter Lab COLORQUEST® II Sphere spectrophotometer that is available from Hunter Associates Laboratory, Inc. of Reston, Va.

The transparent substrates of certain embodiments of the present invention can be formed from a variety of materials. In certain embodiments of the present invention, the article comprises a rigid material, such as glass, including float glass. In certain embodiments of the present invention, the article comprises a flexible material, such as a polymeric material. Examples of polymeric materials suitable for such substrates include, but are not limited to, thermoplastic materials, such as polycarbonates, acrylonitrile butadiene styrene, blends of polyphenylene ether and polystyrene, polyetherimides, polyesters, polysulfones, acrylics, and copolymers and/or blends of any of these. Certain of these articles can have a textured or roughened surface. Such surfaces can be prepared by any suitable method, such as any sandblasting or etching process known to those skilled in the art.

In certain embodiments, the transparent substrate comprises a polyamide. Examples of transparent polyamide substrates, which are commercially available, include Grilamid® TR grades, such as TR 55 and TR 90, which are transparent amorphous thermoplastics commercially available from EMS-Chemie Inc., Sumter, S.C.

Exemplary articles which may be coated according to the present invention include glass articles, such as architectural glass as well as automotive glass.

Exemplary articles, which may be coated according to the present invention, also include optical devices. As used herein the term "optical" means pertaining to or associated with light and/or vision. For example, in certain embodiments, the optical element or device is chosen from ophthalmic elements and devices, display elements and devices, windows, mirrors, and active and passive liquid crystal cell elements and devices. As used herein the term "ophthalmic" means pertaining to or associated with the eye and vision. Non-limiting examples of ophthalmic elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intraocular lenses, magnifying lenses, and protective lenses or visors. As used herein the term "display" means the visible or machine-readable representation of information in words, numbers, symbols, designs or drawings. Non-limiting examples of display elements and devices include screens, monitors, and security elements, such as security marks. As used herein the term "window" means an aperture adapted to permit the transmission of radiation therethrough. Non-limiting examples of windows include building windows and doors, automotive and aircraft transparencies, filters, shutters, and optical switches. As used herein the term "mirror" means a surface that specularly reflects a large fraction of incident light.

The methods of the present invention comprise depositing an ultra thin coating upon the substrate. As used herein, the term "ultra thin" refers to coatings having a film thickness of no more than 2 microns, often less than 2 microns, such as 0.1 to less than 2 microns, or, in some cases, no more than 1.5 microns, such as 0.1 to 1.5 microns, or, in yet other cases, no more than 1 micron, such as 0.1 to 1 micron. For purposes of the present invention, the film thickness of a coating is to be measured by the eddy-current principle (ASTM B244) using, for example a FISHERSCOPE® MMS thicknessmeter, manufactured by Fisher Instruments, using the appropriate probe for the material of the coated substrate.

In certain embodiments of the methods of the present invention, the ultra thin coating is deposited from a composition comprising dispersed organic pigment nanoparticles, wherein the organic pigment nanoparticles are dispersed in a binder, such as a polymeric binder. As used herein, the term "binder" refers to a material in which the organic pigment nanoparticles are distributed and which serves to bond the coating to either a bare or previously coated substrate.

Suitable polymeric binders for inclusion in the ultra thin coatings described herein include, without limitation, those typically used in automotive OEM coatings, automotive refinish coatings, industrial coatings, architectural coatings, coil coatings, protective and marine coatings, and aerospace coatings, among others. These include, as will be appreciated by those skilled in the art, thermoplastic and thermosetting polymers.

In certain embodiments, the ultra thin coating comprises a binder that has been radiation cured. In other words, the coating has been deposited from a radiation curable composition (due to the presence of a compound comprising radiation curable functional group(s)), such as a radiation curable aqueous dispersion, as described in more detail below.

Suitable organic pigments for inclusion in the compositions from which the ultra thin coating is deposited include, for example, azo compounds (monoazo, di-azo, β-Naphthol, Naphthol AS salt type azo pigment lakes, benzimidazolone, di-azo condensation, isoindolinone, isoindoline), and polycyclic (phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone) pigments, and mixtures of any of the foregoing. In certain embodiments, the organic pigment is selected from perylenes, quinacridones, phthalocyanines, isoindolines, dioxazines (that is, triphenedioxazines), 1,4-diketopyrrolopyrroles, anthrapyrimidines, anthanthrones, flavanthrones, indanthrones, perinones, pyranthrones, thioindigos, 4,4'-diamino-1,1'-dianthraquinonyl, as well as substituted derivatives thereof, and mixtures thereof.

Perylene pigments used in the practice of the present invention may be unsubstituted or substituted. Substituted perylenes may be substituted at imide nitrogen atoms for example, and substituents may include an alkyl group of 1 to 10 carbon atoms, an alkoxy group of 1 to 10 carbon atoms and a halogen (such as chlorine) or combinations thereof. Substituted perylenes may contain more than one of any one substituent. The diimides and dianhydrides of perylene-3,4,9,10-tetracarboxylic acid are preferred. Crude perylenes can be prepared by methods known in the art.

Phthalocyanine pigments, especially metal phthalocyanines may be used. Although copper phthalocyanines are more readily available, other metal-containing phthalocyanine pigments, such as those based on zinc, cobalt, iron, nickel, and other such metals, may also be used. Metal-free phthalocyanines are also suitable. Phthalocyanine pigments may be unsubstituted or partially substituted, for example, with one or more alkyl (having 1 to 10 carbon atoms), alkoxy (having 1 to 10 carbon atoms), halogens such as chlorine, or other substituents typical of phthalocyanine pigments. Phthalocyanines may be prepared by any of several methods known in the art. They are typically prepared by a reaction of phthalic anhydride, phthalonitrile, or derivatives thereof, with a metal donor, a nitrogen donor (such as urea or the phthalonitrile itself), and an optional catalyst, preferably in an organic solvent.

Quinacridone pigments, as used herein, include unsubstituted or substituted quinacridones (for example, with one or more alkyl, alkoxy, halogens such as chlorine, or other substituents typical of quinacridone pigments), and are suitable for the practice of the present invention. The quinacridone pigments may be prepared by any of several methods known in the art but are preferably prepared by thermally ring-closing various 2,5-dianilinoterephthalic acid precursors in the presence of polyphosphoric acid.

Isoindoline pigments, which can optionally be substituted symmetrically or unsymmetrically, are also suitable for the practice of the present invention can be prepared by methods known in the art. A suitable isoindoline pigment, Pigment Yellow 139, is a symmetrical adduct of iminoisoindoline and barbituric acid precursors. Dioxazine pigments (that is, triphenedioxazines) are also suitable organic pigments and can be prepared by methods known in the art.

Mixtures of any of the previously described organic pigments can also be used.

To achieve an ultra thin coating having a "strong" color, as is desired in the present invention, it has been discovered that the coating composition should contain a relatively high level of organic pigment nanoparticles. As a result, in certain embodiments, the organic pigment nanoparticles are present in the coating in an amount of at least 20 percent by weight, such as at least 30 percent by weight, or, in some cases at least 40 percent by weight, based on the total solids (i.e., non-volatiles) weight of the coating. In certain embodiments, the organic pigment nanoparticles are present in the coating in an amount of no more than 90 percent by weight, such as no more than 80 percent by weight, or, in some cases no more than 70, 60, or 50 percent by weight, based on the total solids (i.e., non-volatiles) weight of the coating.

As used herein, the term "strong color" means that the maximum optical density of a coating within the visible wavelengths spectrum is relatively high at a given film thickness, such as a film thickness less than 2 microns (as is often the case with the present invention). As will be appreciated, optical density is expressed by $\log_{10}(1/T)$ where T is transmittance of light at a given wavelength.

In addition to exhibiting a strong color, the ultra thin coatings deposited according to the methods of the present invention also have low haze. As used herein, "low haze" means that the cured coating has a BYK Haze index of less than 20, in some cases less than 10, such as less than 5, as measured using a BYK/Haze Gloss instrument according to ASTM D1003.

It has been discovered that, in order to obtain ultra thin coatings that exhibit strong color but with low haze, it is important that at least some, in some cases a majority, of the organic pigments are nanoparticles. By "majority" is meant that greater than 50 percent by weight, such as at least 60 percent by weight, at least 70 percent by weight, at least 80 percent by weight, or, in some cases, at least 90 percent by weight, based on the total weight of the organic pigments in the composition are organic pigment nanoparticles. In some embodiments, substantially all of the organic pigment present in the composition is in the form of organic pigment nanoparticles. In other words, the coating is substantially free, or, in some cases, completely free, of organic pigments that are not organic pigment nanoparticles. As used herein, the term "substantially free" means that the material being discussed is present, if at all, as an incidental impurity. In other words, the material does not affect the properties, particularly the low haze and color strength properties, of the ultra thin coating formed. As used herein, the term "completely free" means that the material being discussed is not present at all.

As used herein, the term "nanoparticles" refers to particles having an average primary particle size of no more than 300 nanometers. The organic pigment nanoparticles present in the coatings described herein, in certain embodiments, have an average primary particle size of less than 150 nanometers, such as less than 70 nanometers, or, in some cases, less than 30 nanometers. The dispersed particle size is the size of the individual particles (primary particles) or agglomerates of primary particles. For purposes of the present invention, average particle size can be measured according to known laser scattering techniques. For example, average particle size can be determined using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle. Average particle size can also be determined by visually examining an electron micrograph of a transmission electron microscopy ("TEM") image of a representative sample of the particles, measuring the diameter of the particles in the image, and calculating the average primary particle size of the measured particles based on magnification of the TEM image. One of ordinary skill in the art will understand how to prepare such a TEM image and determine the primary particle size based on the magnification. The primary particle size of a particle refers to the smallest diameter sphere that will completely enclose the particle. As used herein, the term "primary particle size" refers to the size of an individual particle.

Organic pigment nanoparticles, which are suitable for use in the coating compositions described herein, can be prepared by any of a variety of methods. For example, such particles may be prepared by milling bulk organic pigments with milling media having a particle size of less than about 0.5 mm, preferably less than 0.3 mm and more preferably about 0.1 mm or smaller. The pigment particles can be milled to nanoparticulate sizes in a high energy mill in an organic solvent system, such as butyl acetate using a dispersant, such as Solsperse® 32,500 available from Avecia, Inc. of Wilmington, Del. or in water using a dispersant, such as Solsperse® 27,000 available from Avecia, Inc. with an optional polymeric grinding resin. Other suitable methods include crystallization, precipitation, gas phase condensation, and chemical attrition (i.e., partial dissolution).

In certain embodiments, the coating composition deposited in accordance with the methods of the present invention comprises polymer-enclosed organic pigment nanoparticles that are formed from an aqueous dispersion of polymer-enclosed organic pigment nanoparticles. As used herein, the term "dispersion" refers to a two-phase system in which one phase includes finely divided particles distributed throughout a second phase, which is a continuous phase. The dispersions often are oil-in-water emulsions, wherein an aqueous medium provides the continuous phase of the dispersion in which the polymer-enclosed particles are suspended as the organic phase.

As used herein, the term "polymer-enclosed nanoparticles" refers to nanoparticles that are at least partially enclosed by, i.e., confined within, a polymer to an extent sufficient to physically separate nanoparticles from each other within the aqueous dispersion, thereby preventing significant agglomeration of the particles.

As used herein, the term "aqueous", "aqueous phase", "aqueous medium," and the like, refers to a medium that either consists exclusively of water or comprises predominantly water in combination with another material, such as, for example, an inert organic solvent. In certain embodiments, the amount of organic solvent present in the aqueous dispersions is less than 20 weight percent, such as less than 10 weight percent, or, in some cases, less than 5 weight percent, or, in yet other cases, less than 2 weight percent, with the weight percents being based on the total weight of the dispersion. Non-limiting examples of suitable organic solvents are propylene glycol monobutyl ether, ethylene glycol monohexyl ether, ethylene glycol monobutyl ether, n-butanol, benzyl alcohol, and mineral spirits.

The polymer-enclosed organic pigment nanoparticles used in certain embodiments of the coatings described herein may comprise, for example, a polymer selected from acrylic polymers, polyurethane polymers, polyester polymers, polyether polymers, silicon-based polymers, co-polymers thereof, and mixtures thereof. Such polymers can be produced by any suitable method known to those skilled in the art to which the present invention pertains. Suitable polymers are disclosed in U.S. patent application Ser. No. 10/876,031 at [0061] to [0076], United States Patent Application Publication No. 2005/0287348 A1 at [0042] to [0044], and U.S. patent application Ser. No. 11/337,062 at [0054] to [0079], the cited portions of which being incorporated by reference herein.

The aqueous dispersions of polymer-enclosed organic pigment nanoparticles can be prepared by any of a variety of methods. For example, in certain embodiments, the aqueous dispersion is prepared by a method comprising (A) providing a mixture, in an aqueous medium, of (i) organic pigment particles, (ii) one or more polymerizable, ethylenically unsaturated monomers; and/or (iii) a mixture of one or more polymerizable unsaturated monomers with one or more polymers; and/or (iv) one or more polymers, and then subjecting the admixture to high stress shear conditions in the presence of an aqueous medium to particularize the admixture into polymer-enclosed organic pigment nanoparticles. Such methods are described in detail in U.S. patent application Ser. No. 10/876,031 at [0054] to [0090], the cited portion of which being incorporated by reference herein.

In other embodiments, such aqueous dispersions are made by a method comprising: (1) providing a mixture, in an aqueous medium, of (i) organic pigment particles, (ii) a polymerizable ethylenically unsaturated monomer, and (iii) a water-dispersible polymerizable dispersant, and (2) polymerizing the ethylenically unsaturated monomer and polymerizable dispersant to form polymer-enclosed organic pigment particles comprising a water-dispersible polymer. In these embodiments, the polymerizable dispersant may comprise any polymerizable material that is water-dispersible and which, upon polymerization with the ethylenically unsaturated monomer, produces polymer-enclosed organic pigment particles comprising a water-dispersible polymer. In certain embodiments, the polymerizable dispersant comprises a water-dispersible, polymerizable polyester polyurethane having terminal ethylenic unsaturation. The organic pigment particles can be formed into organic pigment nanoparticles during the polymerization. Such methods are described in detail in United States Patent Application Publication No. 2006/0247372A1 at [0053] to [0058], the cited portion of which being incorporated herein by reference.

In still other embodiments, such aqueous dispersions are made by a method comprising: (1) providing a mixture, in an aqueous medium, of (i) organic pigment particles, and (ii) a polymerizable ethylenically unsaturated compound comprising a multi-functional ethylenically unsaturated monomer, and (2) polymerizing a portion of the multi-functional ethylenically unsaturated monomer to form a radiation curable aqueous dispersion of polymer-enclosed organic pigment particles. It has been discovered that such a method is particularly useful for producing a radiation curable coating composition that can produce the ultra thin coatings described above that exhibit a strong color and low haze. As a result, the present invention is also directed to such methods for making such aqueous dispersions. As used herein, the term "radiation-curable" refers to compositions that include a compound having reactive components that are polymerizable by exposure to an energy source, such as an electron beam (EB), UV light, or visible light. Examples of radiation curable compounds include those that contain ethylenic unsaturation, such as acrylate and methacrylate groups.

As indicated, in the foregoing method, a mixture in an aqueous medium is provided, wherein the mixture comprises organic pigment particles and a polymerizable ethylenically unsaturated compound comprising a multi-functional ethylenically unsaturated compound, such as a bifunctional ethylenically unsaturated compound. As will be appreciated, mixtures of two or more multi-functional ethylenically unsaturated compounds may be used in the compositions of the present invention. In some embodiments, the polymerizable ethylenically unsaturated compound is comprised predominantly of a multi-functional ethylenically unsaturated compound, such as a bifunctional ethylenically unsaturated compound. When used in this context, the term "predominantly" means that the mixture comprises greater than 50% by weight of multi-functional ethylenically unsaturated compound, such as at least 60 percent by weight, at least 70 percent by weight, at least 80 percent by weight, or, in some cases, at least 90 percent by weight, based on the total weight of ethylenically unsaturated compounds present in the mixture. In some embodiments, substantially all of the ethylenically unsaturated compound present in the mixture is multi-functional ethylenically unsaturated compound. In other words, in these embodiments, the mixture is substantially free, or, in some cases, completely free, of monoethylenically unsaturated compound.

As used herein, the term "multi-functional ethylenically unsaturated monomer" refers to monomers containing two or more sites of ethylenic unsaturation per molecule. Specific examples of which include, but are not limited to, bifunctional ethylenically unsaturated monomers, which contain two sites of ethylenic unsaturation per molecule, trifunctional ethylenically unsaturated monomers, which contain three sites of ethylenic unsaturation per molecule, tetrafunctional ethylenically unsaturated monomers, which contain four sites of ethylenic unsaturation per molecule, and pentafunctional ethylenically unsaturated monomers, which contain five sites of ethylenic unsaturation per molecule. As will be appreciated, mixtures of two or more multi-functional ethylenically unsaturated monomers may be used in the compositions of the present invention.

In certain embodiments, the multi-functional ethylenically unsaturated monomer is comprised predominantly of bifunctional ethylenically unsaturated monomer. When used in this context, the term "predominantly" means that the mixture comprises at least 50% by weight of bifunctional ethylenically unsaturated monomer, such as at least 60 percent by weight, at least 70 percent by weight, at least 80 percent by weight, or, in some cases, at least 90 percent by weight, based on the total weight of multi-functional ethylenically unsaturated monomers present in the mixture. In some embodiments, substantially all of the multi-functional ethylenically unsaturated monomer present in the mixture is bifunctional ethylenically unsaturated monomer. In other words, the mixture is substantially free, or, in some cases, completely free, of trifunctional, tetrafunctional, and/or pentafunctional ethylenically unsaturated monomer.

Specific examples of bifunctional ethylenically unsaturated oligomers and polymers include, for example, ethylenically unsaturated polyesters, polyurethanes, acrylics, and epoxies, as described above. Specific examples of bifunctional ethylenically unsaturated monomers are 1,3-butylene glycol di(meth)acrylate, 1,6-hexanediol di(meth)acrylate, neopentyl glycol di(meth)acrylate, bisphenol A di(meth)acrylate, bisphenol A glycidyl di(meth)acrylate, ethylene oxide-modified bisphenol A di(meth)acrylate, ethylene oxide-modified bisphenol A glycidyl di(meth)acrylate, 2,2-bis(4-methacryloxypropoxyphenyl)propane, 7,7,9-trimethyl-4,13-dioxa-3,14-dioxo-5,12-diazahexadecane-1,1,6-diol di(meth)acrylate, neopentyl glycol hydroxypivalate di(meth)acrylate, caprolactone-modified neopentyl glycol hydroxypivalate di(meth)acrylate, trimethylolethane di(meth)acrylate, trimethylolpropane di(meth)acrylate, and the like.

Specific examples of tri and higher functional ethylenically unsaturated monomers that are suitable for use in certain embodiments of the methods of the present invention include, but are not limited to, trimethylolmethane tri(meth)acrylate, trimethylolethane tri(meth)acrylate, trimethylolpropane tri(meth)acrylate, pentaerythritol tri(meth)acrylate, dipentaerythritol tri(meth)acrylate, di-trimethylolpropane tetra(meth)acrylate, pentaerythritol tetra(meth)acrylate, dipentaerythritol tetra(meth)acrylate, dipentaerythritol hexa(meth)acrylate, and the like.

In certain embodiments of the foregoing method, the mixture in an aqueous medium also comprises a monoethylenically unsaturated monomer. As used herein, the term "monoethylenically unsaturated monomer" refers to monomers containing one site of ethylenic unsaturation per molecule. In certain of these embodiments, however, the polymerizable ethylenically unsaturated compound is nevertheless comprised predominantly of a polyethylenically unsaturated monomer, as described earlier. As a result, in these embodiments, the mixture comprises no more than 50% by weight of monoethylenically unsaturated monomer, such as no more than 40 percent by weight, no more than 30 percent by weight, no more than 20 percent by weight, or, in some cases, no more than 10 percent by weight, based on the total weight of ethylenically unsaturated compounds present in the mixture.

In certain embodiments of the foregoing methods of the present invention, the organic pigment particles, after being mixed with the ethylenically unsaturated compound comprising a polyethylenically unsaturated compound in the aqueous medium, are formed into nanoparticles (i.e., the nanoparticles are formed in situ). In certain embodiments, the organic pigment nanoparticles are formed by subjecting the aqueous medium to pulverizing conditions. For example, the particles can be milled with milling media having a particle size of less than 0.5 millimeters, or less than 0.3 millimeters, or, in some cases, less than 0.1 millimeters. In these embodiments, the organic pigment particles can be milled to nanoparticle size in a high energy mill in the presence of the aqueous medium, the polyethylenically unsaturated compound, and, if desired, a monoethylenically unsaturated compound as well as other materials, such as a water-dispersible polymerizable dispersant or other dispersants, such as SOLSPERSE 27000, available from Avecia, Inc.

In certain embodiments, the multi-functional ethylenically unsaturated compound, such as a bifunctional ethylenically unsaturated compound (such as a monomer) is present in the aqueous dispersions in an amount of at least 20 weight percent, or in an amount of at least 40 or at least 50 percent by weight, such as 20 to 80 weight percent, or in an amount of 40 to 80 weight percent, or in an amount of 50 to 70 weight percent, or 30 to 60 weight percent, with weight percents being based on weight of total solids present in the dispersion.

As indicated, the foregoing methods for making aqueous dispersions of polymer-enclosed organic pigment nanoparticles include the step of polymerizing a portion of the multifunctional ethylenically unsaturated monomer to form a radiation curable aqueous dispersion of polymer-enclosed organic pigment nanoparticles. In certain embodiments, at least a portion of the polymerization occurs during the in situ formation of nanoparticles described above.

A free radical initiator may be used to initiate the foregoing polymerization. Both water and oil soluble initiators can be used. Non-limiting examples suitable water-soluble initiators include ammonium peroxydisulfate, potassium peroxydisulfate and hydrogen peroxide. Non-limiting examples of oil soluble initiators include t-butyl hydroperoxide, dilauryl peroxide and 2,2'-azobis(isobutyronitrile). In many cases, the reaction is carried out at a temperature ranging from 20° to 80° C. The polymerization can be carried out in either a batch or a continuous process. The length of time necessary to carry out the polymerization can range from, for example, 10 minutes to 6 hours, provided that the time is sufficient to polymerize a portion of the multifunctional ethylenically unsaturated compound.

Once the polymerization process is complete, the resultant product is a stable dispersion of polymer-enclosed organic pigment nanoparticles in an aqueous medium which can contain some organic solvent. Some or all of the organic solvent can be removed via reduced pressure distillation at a temperature, for example, of less than 40° C. As used herein, the term "stable dispersion" or "stably dispersed" means that the polymer-enclosed organic pigment nanoparticles neither settle nor coagulate nor flocculate from the aqueous medium upon standing.

It was a surprising and unexpected discovery that such a stable dispersion could be formed using the methods of the present invention, wherein the organic pigment particles are mixed with an ethylenically unsaturated compound comprising a polyethylenically unsaturated compound in the aqueous medium. Indeed, it was discovered that, despite the, in some cases, predominant presence of a multi-functional ethylenically unsaturated compound, including monomer, it is possible to polymerize the compound during formation of nanoparticles, as described above, to an extent sufficient to form polymer-enclosed organic pigment nanoparticles that are stably dispersed in the aqueous medium, but also to limit the extent of such polymerization such that a gelled reaction product is not formed. It is believed that the remaining, unpolymerized, ethylenically unsaturated compound, remains available for polymerization upon application of the composition to a substrate and exposure of the composition to radiation cure conditions, thereby resulting in a cured coating. As a result, when it is stated herein that "a portion" of the multi-functional ethylenically unsaturated compound is polymerized to form a radiation curable aqueous dispersion of polymer-enclosed particles, it means that the multi-functional ethylenically unsaturated compound is polymerized to an extent sufficient to form polymer-enclosed organic pigment nanoparticles but not so much as to form a gelled reaction product that is no longer a radiation curable composition.

As a result, the aqueous dispersions described above, may, and often do, comprise an initiator to initiate cure under radiation cure conditions. In certain embodiments, the radiation cure initiator comprises a free radical photoinitiator. In certain embodiments, the photoinitiator is added to the aqueous dispersion after the stable dispersion of polymer-enclosed organic pigment particles, such as nanoparticles, in an aqueous medium described above, which can contain some organic solvent, has been formed.

Examples of free radical photoinitiators suitable for use in the present invention include, for example, alpha-cleavage photoinitiators and hydrogen abstraction photoinitiators. Cleavage-type photoinitiators include acetophenones, α-aminoalkylphenones, benzoin ethers, benzoyl oximes, acylphosphine oxides and bisacylphosphine oxides and mixtures thereof. Abstraction-type photoinitiators include benzophenone, Michler's ketone, thioxanthone, anthraquinone, camphorquinone, fluorone, ketocoumarin and mixtures thereof.

Specific nonlimiting examples of free radical photoinitiators that may be used in the coating compositions of the present invention include benzil, benzoin, benzoin methyl ether, benzoin isobutyl ether benzophenol, acetophenone, benzophenone, 4,4'-dichlorobenzophenone, 4,4'-bis(N,N'-dimethylamino)benzophenone, diethoxyacetophenone, fluorones, e.g., the H-Nu series of initiators available from Spectra Group Ltd., 2-hydroxy-2-methyl-1-phenylpropan-1-one, 1-hydroxycyclohexyl phenyl ketone, 2-isopropylthioxantone, α-aminoalkylphenone, e.g., 2-benzyl-2-dimethylamino-1-(4-morpholinophenyl)-1-butanone, acylphosphine oxides, e.g., 2,6-dimethylbenzoyldiphenyl phosphine oxide, 2,4,6-trimethylbenzoyldiphenylphosphine oxide, bis(2,4,6-trimethylbenzoyl)phenyl phosphine oxide, 2,6-dichlorobenzoyl-diphenylphosphine oxide, and 2,6-dimethoxybenzoyl-diphenylphosphine oxide, bisacylphosphine oxides, e.g., bis(2,6-dimethyoxybenzoyl)-2,4,4-trimethylepentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, and bis(2,6-dichlorobenzoyl)-2,4,4-trimethylpentylphosphine oxide, and mixtures thereof.

In certain embodiments, the radiation cure initiator is present in the coating compositions in an amount of 0.01 up to 10 percent by weight or, in some embodiments, 0.01 up to 5 percent by weight, or, in yet other embodiments, 0.01 up to 2 percent by weight, based on the total weight of the aqueous dispersion.

In certain embodiments, the polymer-enclosed organic pigment nanoparticles are present in the aqueous dispersions in an amount of at least 20 percent by weight, such as at least 30 percent by weight, such as 20 to 80 weight percent, or in an amount of 30 to 80 weight percent, or in an amount of 30 to 50 weight percent, with weight percents being based on weight of total solids present in the dispersion.

The resulting radiation curable coating composition can be applied to the substrate by any suitable technique, such as spraying, brushing, spin-coating, dip coating and use of a draw-down blade or wire bar to produce an ultra thin coating.

Once applied, the radiation curable composition can be cured by subjecting the at least partially coated substrate to ionizing radiation or actinic radiation. As used herein, the term "ionizing irradiation", refers to high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons can sometimes be particularly suitable. However, regardless of the type of radiation and the type of equipment used for its generation or application, the use thereof in the practice of the invention as described herein is contemplated as falling within the scope of this invention so long as the ionization radiation is equivalent to at least 100,000 electron volts.

While there is no upper limit to the electron energy that can be so applied advantageously, it is believed that the effects desired in the practice of this invention can be accomplished without having to go to above 20,000,000 electron volts. Generally, the higher the electron energy used, the greater is the depth of penetration into the massive structure of the materials to be treated. For other types of radiation, such as gamma and X-rays, energy systems equivalent to the above range of electron volts are often desirable.

As used herein, the term "irradiation" includes what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation". The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotons, cyclotrons, etc. Neutron radiation can be produced by bombarding a selected light metal, such as beryllium, with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts. In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available and are described in, for example, U.S. Pat. No. 2,763,609 and in British Pat. No. 762,953.

The amount of ionizing irradiation employed can range, for example, from 0.2 megarad to 20 megarads, such as between 0.2 megarad and 10 megarads, at, for example, 150 to 300 kiloelectron volts, such as 170 to 250 kiloelectron volts. A "rad" is defined as that amount of radiation required to supply 100 ergs per gram of material being treated, and a "megarad" is $10^6$ rads. The total dosage is the total amount of irradiation received by the material.

As used herein, the term "actinic radiation" refers to actinic light, such as ultraviolet light. Any suitable source which emits ultraviolet light having a wavelength of 180 to 400 nanometers may be used in the practice of the present invention. Suitable sources are mercury vapor lamps, carbon arcs, low pressure mercury vapor lamps, medium pressure mercury vapor lamps, high pressure mercury vapor lamps, swirl-flow plasma arcs, ultraviolet light emitting diodes and ultraviolet light emitting lasers.

The time of exposure to ultraviolet light and the intensity of the ultraviolet light to which the coating composition is exposed may vary greatly. Generally, the exposure to ultraviolet light should continue until either the film is thermoset throughout or at least cured to the point where subsequent reactions cause the film to thermoset throughout. The appropriate time of exposure and intensity of ultraviolet light used can be determined by those skilled in the art.

The coatings described above may be used to form a single coating layer on an article, such as a transparent article, such a layer being the ultra thin coating described herein. In certain embodiments, however, another coating layer, such as a hard coat, may be deposited over at least a portion of the ultra thin coating. As a result, the present invention is also directed to articles, such as transparencies, at least partially coated with a multi-layer coating comprising: (a) an ultra thin coating of the type described herein, and (b) a second layer comprising a hard coat. Suitable hard coats, as well as methods for their preparation and application, are described in United States Patent Application Publication No. 2006/0247372A1 at [0070] to [0094], the cited portion of which being incorporated herein by reference.

Illustrating the invention are the following examples that are not to be considered as limiting the invention to their details. All parts and percentages in the examples, as well as throughout the specification, are by weight unless otherwise indicated.

EXAMPLES

Example 1

Polyurethane Di-acrylate Dispersion

This example describes the preparation of a polyurethane dispersion that was subsequently used to form the respective polyurethane/nanopigment dispersions of Examples 2 to 4. The polyurethane dispersion was prepared from the following mixture of ingredients in the ratios indicated:

| Ingredients | Weight (grams) |
|---|---|
| Charge I | |
| Poly (neopentyl adipate)[1] | 937.5 |
| Hydroxyethyl methacrylate (HEMA) | 244.0 |
| Dimethylolpropionic acid (DMPA) | 377.3 |
| Tri-ethylamine | 170.9 |
| Butylated hydroxytoluene | 2.9 |
| Triphenyl phosphite | 2.9 |
| Charge II | |
| Hexanediol di-acrylate (HDDA) | 1098.3 |
| Charge III | |
| Isophorone di-isocyanate (IPDI) | 1250.5 |
| Charge IV | |
| Hexanediol di-acrylate (HDDA) | 125.0 |
| Charge V | |
| Deionized water | 4003.4 |
| Ethylenediamine | 31.6 |
| Dimethylethanolamine | 60.2 |

[1]Poly (neopentyl adipate) having a number average molecular weight of 1000.

The polyurethane dispersion was prepared in a four neck round bottom flask equipped with an electronic temperature probe, mechanical stirrer, condenser, and a heating mantle. Charge I was stirred 30 minutes in the flask at a temperature of 90° C. Charge II was added and the mixture was cooled to 60° C. Charge III was added over a 10 minute period. Charge IV was added and the resulting mixture was gradually heated to 90° C. over 40 minutes and then held at 90° C. for 3 hours. Charge V was stirred in a separate flask and heated to 70° C. 3367.3 g of the reaction product of Charges I, II, III, and IV was added to Charge V over 13 minutes. The final product was a translucent emulsion with an acid value of 14.5, a Brookfield viscosity of 72600 centipoise (spindle #6 at 60 rpm), a pH of 7.65, and a nonvolatile content of 36.7% as measured at 110° C. for one hour.

Example 2

Cyan Nanopigment Dispersion

This example describes the preparation of a nano-sized PB 15:3 phthalocyanine blue pigment dispersion. The dispersion was prepared from the following mixture of ingredients in the ratios indicated:

| Ingredients | Weight (grams) |
|---|---|
| Charge I | |
| Polyurethane di-acrylate dispersion of Example 1 | 1029.5 |
| Deionized water | 1415.4 |
| Hydroquinone methyl ether (MEHQ) | 0.4 |
| PB 15:3 pigment | 381.0 |
| Shellsol OMS (Shell Chemical Co.) | 25.0 |

The ingredients were first dispersed by re-cycling 30 minutes through an Eiger Mini Mill 250 containing 0.8 mm Zirconox YTZ® grinding media. The mixture was then milled for 20 hours in an Eiger Mini Mill 250 modified to contain 0.3 mm Zirconox YTZ® grinding media. The progress of the milling was monitored by visually observing changes in the transparency of thin films of samples drawn down over black and white Leneta paper. The final product was a blue liquid with a nonvolatile content of 27.0% as measured at 110° C. for one hour.

Example 3

Magenta Nanopigment Dispersion

This example describes the preparation of a nano-sized PR 122 quinacridone magenta pigment dispersion. The dispersion was prepared from the following mixture of ingredients in the ratios indicated:

| Ingredients | Weight (grams) |
|---|---|
| Charge I | |
| Polyurethane di-acrylate dispersion of Example 1 | 1115.8 |
| Deionized water | 1326.8 |
| Hydroquinone methyl ether (MEHQ) | 0.4 |
| PR122 pigment | 381.0 |
| Shellsol OMS (Shell Chemical Co.) | 25.0 |

The ingredients were first dispersed by re-cycling 30 minutes through an Eiger Mini Mill 250 containing 0.8 mm Zirconox YTZ® grinding media. The mixture was then milled for 20 hours in an Eiger Mini Mill 250 modified to contain 0.3 mm Zirconox YTZ® grinding media. The progress of the milling was monitored by visually observing changes in the transparency of thin films of samples drawn down over black and white Leneta paper. The final product was a magenta liquid with a nonvolatile content of 25.9% as measured at 110° C. for one hour.

Example 4

Yellow Nanopigment Dispersion

This example describes the preparation of a nano-sized PY 110 isoindolinone yellow pigment dispersion. The dispersion was prepared from the following mixture of ingredients in the ratios indicated:

| Ingredients | Weight (grams) |
|---|---|
| Charge I | |
| Polyurethane di-acrylate dispersion of Example 1 | 1115.8 |
| Deionized water | 1326.8 |
| Hydroquinone methyl ether (MEHQ) | 0.4 |
| PY 110 pigment | 381.0 |
| Shellsol OMS (Shell Chemical Co.) | 25.0 |

The ingredients were first dispersed by re-cycling 30 minutes through an Eiger Mini Mill 250 containing 0.8 mm Zirconox YTZ® grinding media. The mixture was then milled for 20 hours in an Eiger Mini Mill 250 modified to contain 0.3 mm Zirconox YTZ® grinding media. The progress of the milling was monitored by visually observing changes in the transparency of thin films of samples drawn down over black and white Leneta paper. The final product was a yellow liquid with a nonvolatile content of 27.2% as measured at 110° C. for one hour.

Example 5

UV-Curable Cyan Coating

This example describes the preparation of a set of cyan waterborne UV-curable coatings that form cured films containing 37% nanopigment by weight. First, an un-reduced coating was prepared from the following mixture of ingredients in the amounts indicated:

| Ingredients | Weight (grams) |
|---|---|
| Cyan nanopigment dispersion of Example 2 | 290.31 |
| Irgacure 500[2] | 2.58 |
| SR 9035[3] | 5.17 |
| BYK 346[4] | 1.93 |

[2]Photoinitiator from Ciba Specialty Chemicals.
[3]Ethoxylated (15) trimethylolpropane triacrylate from Sartomer Company, Inc.
[4]Siloxane wetting agent from Altana AG.

The un-reduced coating was prepared at 29% solids by stirring the ingredients in a small metal can. A set of three lower solids coatings were made by adding water to the unreduced coating in the amounts indicated:

| | Ingredient weight (grams) | |
|---|---|---|
| Example Number | Un-reduced coating | Water |
| 5A (10% solids) | 60.34 | 114.66 |
| 5B (25% solids) | 109.19 | 17.46 |
| 5C (20% solids) | 51.72 | 23.28 |

Example 6

Application of UV-Curable Cyan Coating

This example describes the application of a set of cyan waterborne UV-curable coatings to 4×4 inch glass squares. The coatings from examples 5A, 5B, and 5C were applied to the glass substrate via a spin coating process. About 1-2 mL of each example was dispensed onto the glass and the glass square rotated for eight seconds at speeds of 1200 to 2000 rpm.

The coated glass squares were heated in a forced air oven for 10 minutes before UV-curing under the following conditions: 2 Hg bulbs, 6 inch lamp height, conveyor speed of 20 ft/min, 530 mJ/cm$^2$, and 1080 mW/cm$^2$. Final coating weights ranged from 0.38 to 1.37 mg/in$^2$, which corresponds to coating thicknesses in the range of 0.3 to 1.5 microns.

Example 7

Preparation of Clear UV-Curable Coating

This example describes the preparation of a clear solventborne UV-curable coating. The coating was prepared from the following mixture of ingredients in the amounts indicated:

| Ingredients | Weight (grams) |
|---|---|
| CN 991[5] | 14.92 |
| Irgacure 500 | 0.60 |
| SR 344[6] | 4.48 |
| Methyl isobutyl ketone (MIBK) | 80.00 |

[5]Urethane acrylate resin from Sartomer Company, Inc.
[6]Polyethylene glycol (400) di-acrylate from Sartomer Company, Inc.

Example 8

Preparation of UV-Curable Cyan Coating with Conventional Pigment

This example describes the preparation of a set of solvent-borne UV-curable coatings that form cured films containing 36% conventional cyan pigment by weight. First, an un-reduced and un-pigmented coating was prepared from the following mixture of ingredients in the amounts indicated:

| Ingredients | Weight (grams) |
| --- | --- |
| CN 991 | 8.13 |
| Irgacure 500 | 0.52 |
| SR 344 | 2.44 |
| Methyl isobutyl ketone (MIBK) | 73.75 |

The unpigmented coating was stirred in a small metal can using a flat mixing blade. Approximately 120 grams of grinding media (2 mm, Zircoa) was added to the un-pigmented coating under agitation. While mixing, 6.29 grams of PB 15:3 pigment was slowly added to the coating. The pigmented coating and grinding media were mixed at high speed for 15 minutes to achieve a Hegman grind gage reading of 7+. The grinding media were then filtered out of the final coating. The final coating had a nonvolatile content of 19% as measured at 110° C. for one hour. A set of two lower solids coatings were made by adding methyl isobutyl ketone (MIBK) to the unreduced coating in the amounts indicated:

| | Ingredient weight (grams) | |
| --- | --- | --- |
| Example Number | Un-reduced coating | MIBK |
| 8A (15% solids) | 20.00 | 5.42 |
| 8B (10% solids) | 15.00 | 13.60 |

Example 9

Application of UV-Curable Coatings with No Pigment or Conventional Pigment

This example describes the application of a set of solvent-borne UV-curable coatings with conventional pigment to 4x4 inch glass squares. The coatings from examples 7, 8A, and 8B were applied to the glass substrate via a spin coating process. About 1-2 mL of each example was dispensed onto the glass and the glass square rotated for eight seconds at speeds of 1100 to 2000 rpm.

The coated glass squares were heated in a forced air oven for 10 minutes before UV-curing under the following conditions: 2 Hg bulbs, 5 inch lamp height, conveyor speed of 23 ft/min, 820 mJ/cm$^2$, and 600 mW/cm$^2$. Final coating weights ranged from 0.64 to 1.72 mg/in$^2$, which corresponds to coating thicknesses in the range of 1.3 to 2.0 microns.

Example 10

Color Measurements of UV-Curable Coatings Applied to Glass Substrate

This example provides optical measurements for each of the coatings applied to the glass substrate. All of the optical measurements were taken using a Hunter Lab Ultrascan XE spectrophotometer.

| Coating Example | Coating Weight (mg/in$^2$) | Coating Thickness (microns) | % Transmission | L* | a* | b* | % Haze |
| --- | --- | --- | --- | --- | --- | --- | --- |
| 5A | 0.44 | 0.3-0.5 | 44.1 | 72.3 | −38.0 | −36.1 | 2.2 |
| 5A | 0.38 | 0.2-0.3 | 49.9 | 76.0 | −33.3 | −29.9 | 2.2 |
| 5B | 1.37 | 1.2-1.5 | 19.2 | 50.9 | −26.2 | −60.1 | 2.9 |
| 5C | 0.50 | 1.0-1.3 | 30.2 | 61.8 | −41.1 | −50.2 | 2.6 |
| 7 | 0.87 | 1.8-2.0 | 92.4 | 97.0 | −0.4 | 0.0 | 0.1 |
| 8A | 1.72 | 1.7-1.9 | 22.8 | 22.8 | −47.5 | −45.6 | 27.7 |
| 8B | 0.64 | 1.3-1.5 | 43.1 | 43.1 | −43.3 | −31.6 | 29.9 |

These measurements illustrate that coatings with a thickness of 2 microns or less can contain more than 35% nanopigment and still have optical clarity (low % haze) close to that of a colorless unpigmented coating. Similar coatings containing a comparable level of conventional pigment were significantly hazier.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A method for coating a non-cellulose based substrate, comprising:
    (a) depositing a composition on the substrate, the composition comprising:
        (i) at least 20 percent by weight, based on the total solids weight of the composition, of organic pigment nanoparticles; and
        (ii) a binder in which the nanoparticles are dispersed; and
    (b) curing the binder to form a cured ultra-thin coating that has low haze and a dry film thickness of no more than 2 microns, wherein the cured ultra-thin coating comprises at least 20 percent by weight, based on the total solids weight of the coating, of organic pigment nanoparticles.

2. The method of claim 1, wherein the substrate is a non-porous substrate.

3. The method of claim 1, wherein the substrate is formed from a material selected from a metal, a silicate, a polymer, a textile, a leather, and a compressible material.

4. The method of claim 3, wherein the material comprises a polymer selected from a polycarbonate and/or a polyamide.

5. The method of claim 1, wherein the substrate is transparent.

6. The method of claim 1, wherein the ultra-thin coating has a film thickness of no more than 1.5 microns.

7. The method of claim 1, wherein the binder is cured by radiation.

8. The method of claim 1, wherein the ultra-thin coating has a BYK Haze index of less than 5 as measured using a BYK/Haze Gloss instrument according to ASTM D1003.

9. The method of claim 1, wherein the organic pigment nanoparticles are the majority of a total amount of organic pigments in the composition.

10. The method of claim 1, wherein the organic pigment nanoparticles have an average primary particle size of less than 70 nanometers.

11. The method of claim 1, wherein the organic pigment nanoparticles comprise polymer-enclosed organic pigment nanoparticles formed from an aqueous dispersion of polymer-enclosed particles.

12. The method of claim 1, wherein the composition further comprises a photo initiator.

13. The method of claim 11, wherein the aqueous dispersion of polymer-enclosed particles is prepared by a method comprising:
 (1) providing a mixture, in an aqueous medium, of:
  (a) particles, and
  (b) a polymerizable ethylenically unsaturated compound comprising a multi-functional ethylenically unsaturated monomer; and
 (2) polymerizing a portion of the multi-functional ethylenically unsaturated monomer.

14. The method of claim 13, wherein the multi-functional ethylenically unsaturated monomer comprises a bifunctional ethylenically unsaturated monomer.

15. The method of claim 13, wherein the particles comprise organic pigment particles, the organic pigment particles are formed into nanoparticles after being mixed with the ethylenically unsaturated compound comprising a polyethylenically unsaturated compound in the aqueous medium.

16. The method of claim 14, wherein the bifunctional ethylenically unsaturated monomer is present in the aqueous dispersion in an amount of at least 20 weight percent, based on weight of total solids present in the dispersion.

17. The method of claim 13, further comprising:
 (3) adding a photoinitiator.

* * * * *